May 8, 1934.  H. H. TIMIAN  1,957,561
ENGINE
Filed June 27, 1931  2 Sheets-Sheet 1
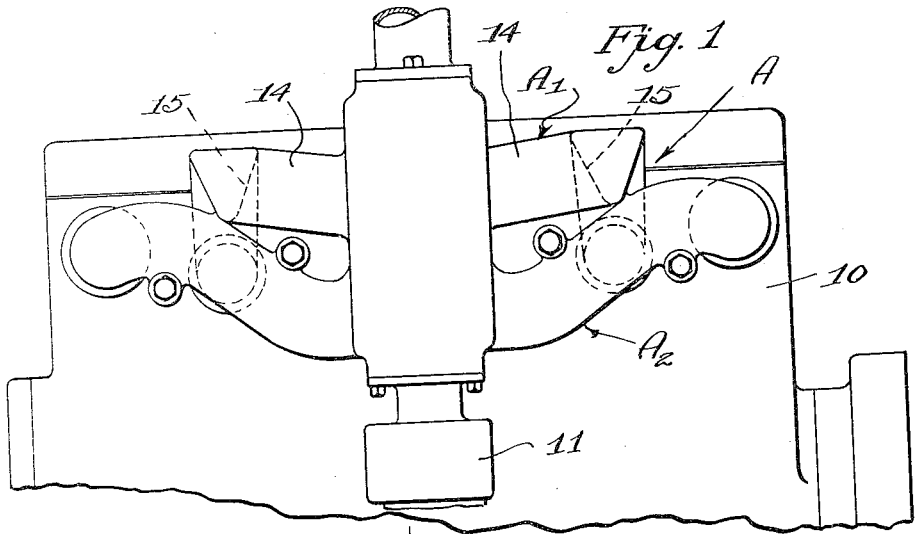
Fig. 1
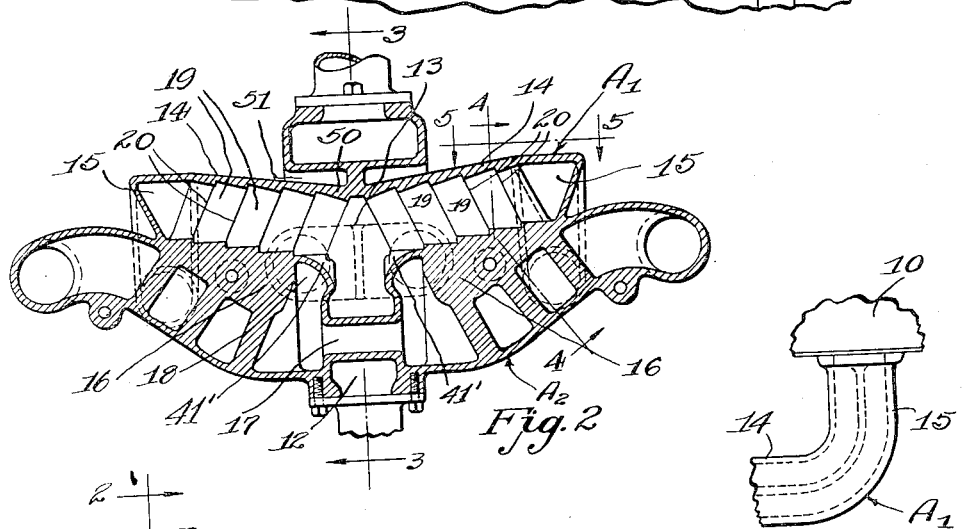
Fig. 2
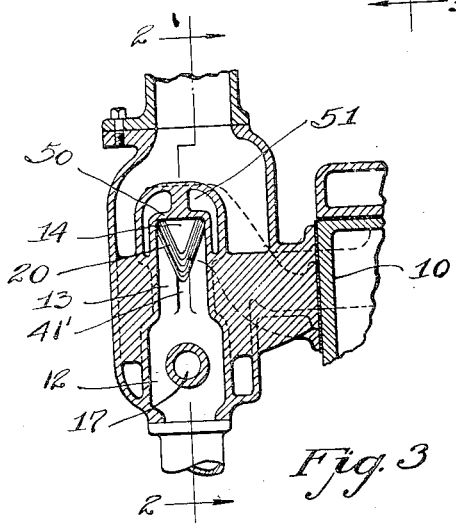
Fig. 3
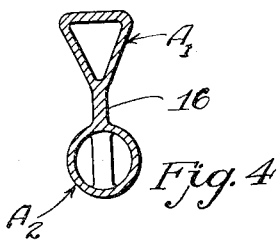
Fig. 4
Fig. 5
INVENTOR.
Harold H. Timian
BY
ATTORNEY.

May 8, 1934.  H. H. TIMIAN  1,957,561
ENGINE
Filed June 27, 1931   2 Sheets-Sheet 2
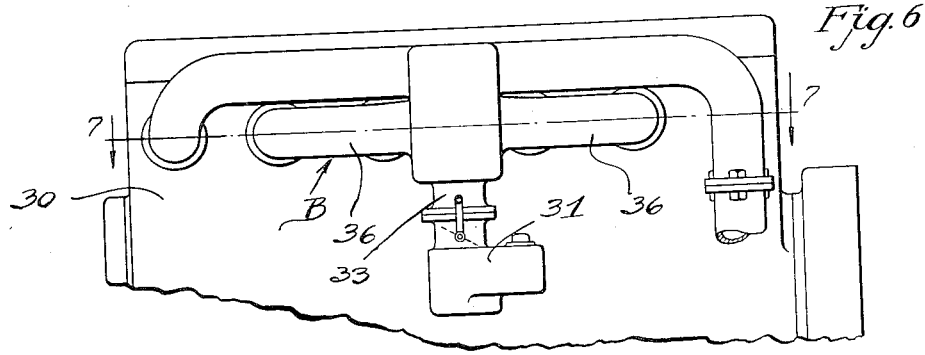
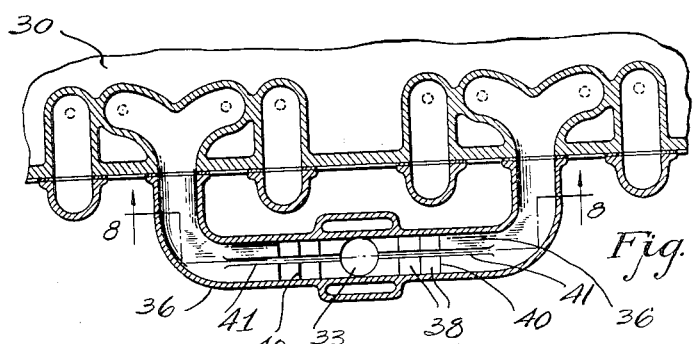
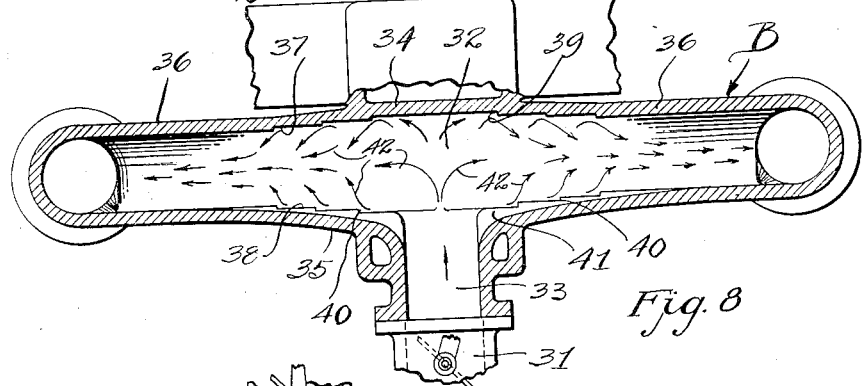
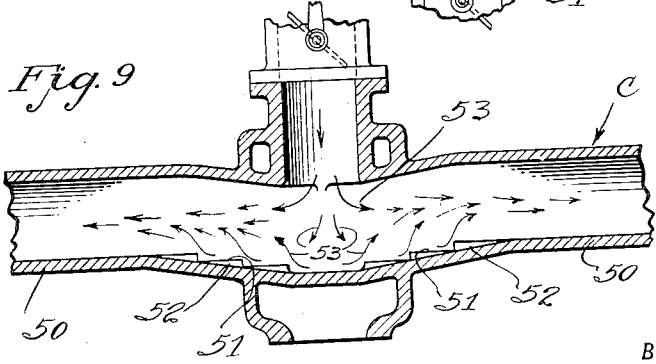
INVENTOR.
Harold H. Timian
BY
ATTORNEY.

Patented May 8, 1934

1,957,561

UNITED STATES PATENT OFFICE 1,957,561

ENGINE

Harold H. Timian, Detroit, Mich., assignor to Continental Motors Corporation, Detroit, Mich., a corporation of Virginia Application June 27, 1931, Serial No. 547,263

25 Claims. (Cl. 123—122)

My invention relates to engines of the internal combustion type and more particularly relates to manifold structures therefor.

The constant aim of automotive engineers and manufacturers of internal combustion engines is to improve the operating efficiency of such engines and to improve the operating performance of the engine by providing a uniform fuel mixture distribution for the engine cylinders whereby uniform fuel distribution may be obtained at all engine speeds and during the engine acceleration.

In order to obtain the results as outlined above I have undertaken considerable experimental development work and I have made a careful study of the fuel flow characteristics in various types of manifold structures. As a result I have discovered certain facts enabling me to construct manifolds designed to eliminate the factors which tend to cause a non-uniform distribution of the fuel mixture.

An object of my present invention is to construct an internal combustion engine having generally improved operating characteristics by providing an intake manifold structure which is constructed to impart directional movement to the fuel mixture in such a way as to provide for efficient fuel distribution to the engine cylinders. Another object of my invention is to construct an intake manifold structure for use with an internal combustion engine in which the operating efficiency of the engine is improved by providing an intake manifold structure which is provided with means acting on the fuel flow for eliminating the tendency of wet particles of said fuel to creep along the walls of the manifold structure thereby providing an improved fuel mixture flow which may be more efficiently controlled and distributed to the engine cylinders.

A further object of my present invention is to provide a manifold structure having a plurality of stepped portions in the fuel mixture conducting means for aiding the fuel mixture flow and providing a mixture which can be more efficiently distributed to the engine cylinders. A still further object of my present invention is to utilize a manifold structure having stepped portions in such a way as to bring the fuel mixture flow into better heat transference relation with a source of heat.

For a more detailed understanding of my invention, reference may be had to the accompanying drawings which illustrate one form which my invention may assume, and in which:

Fig. 1 is a side elevational view of an internal combustion engine constructed in accordance with my invention, Fig. 2 is a vertical longitudinal sectional view of the manifold structure taken on the line 2—2 of Fig. 3, Fig. 3 is a vertical transverse sectional view taken on the line 3—3 of Fig. 2, Figs. 4 and 5 are detail views taken respectively on the lines 4—4 and 5—5 of Fig. 2, Fig. 6 is an elevational view of an internal combustion engine illustrating a modified form of manifold structure, Fig. 7 is a horizontal sectional view taken on the line 7—7 of Fig. 6, Fig. 8 is a vertical longitudinal sectional view taken substantially on the line 8—8 of Fig. 7, and Fig. 9 is a detail sectional view illustrating the principle of my invention incorporated in a manifold structure of the down-draft type.

With reference to the construction illustrated in Figs. 1 to 5 inclusive 10 designates an internal combustion engine provided with a fuel mixture forming device or carburetor 11. A manifold structure A is adapted for use with this internal combustion engine and preferably includes an intake manifold structure $A_1$ and an exhaust manifold portion $A_2$. This manifold structure is provided with a primary fuel mixture conducting portion 12 which is adapted for connection with the fuel mixture forming device 11 and communicates with a fuel mixture distributing chamber 13. Manifold branches are constructed in open communication with the fuel mixture distributing chamber 13 and preferably include the lateral runner portions 14 and port runner portions 15.

The exhaust manifold portion $A_2$ preferably underlies the intake manifold portion $A_1$ and this manifold structure is constructed in such a way as to place the intake portion in heat transference relation with the exhaust manifold portion, the heat of the exhaust gases being preferably conducted to the intake manifold branch portion by means of a web or other suitable heat conducting device 16. Preferably the exhaust manifold structure is constructed to conduct a portion of the exhaust gases through the passage 17 extended across the primary fuel mixture conducting portion 12 and that portion of the exhaust manifold adjacent to the portion 12 is preferably enlarged as at 18 for providing a maximum amount of heat to the fuel mixture distributing chamber 13.

As illustrated in Figures 2 to 4 inclusive, it will be noted that the intake manifold portion $A_1$ is constructed substantially triangular in cross-section, the side walls of said lateral runner and port runner portions converging downwardly and constructed in such a way as to locate that portion of the runner portions adjacent the intersection of the side walls in heat transference relation with the exhaust manifold portion $A_2$.

The lateral runner portions 14 are preferably constructed in such a way as to provide a plurality of stepped portions 19, these stepped portions being spaced by the intermediate shoulders 20 and as illustrated in Figs. 2 and 3 the side, top and bottom walls of the lateral runner are constructed with stepped portions. It will be noted that the shoulders 20 on the side walls are constructed to slope downwardly and outwardly with respect to the fuel distributing chamber 13.

It will thus be noted that in the operation of the engine the fuel mixture which contains a certain percentage of wet fuel particles is caused to be deflected by the shoulders 20 as the same flows through the manifold branch. The shoulders in the top wall of the lateral runner and the side walls tend to urge the fuel particles downwardly and to concentrate the heavier fuel particles in the vicinity of the floor or bottom wall of said runner portion where the heat of the exhaust gases may be readily transferred thereto, thereby causing revaporization of the wet fuel particles which tend to form in the lateral runner portion. A large share of the heavier fuel particles which are deflected downwardly from the top wall of the lateral runner are atomized when they are deflected within the fuel mixture stream flowing substantially through the central portion of the runner. Because of my construction which encourages movement of precipitated fuel from the top wall to the lower heated region I can include an air space 51 covering substantially the entire upper wall 50 of said fuel mixture distributing chamber 13, thereby eliminating volumetric power loss at relatively high engine speeds when the major portion of the fuel mixture is impinged against the top wall 50.

The shoulders 20 which form stepped portions in the floor or bottom wall of the lateral runner tend to deflect the wet fuel which has accumulated on the floor of the runner in accelerating the engine and to cause the wet fuel to be deflected towards the axis of the runner where the same is acted upon by the high velocity fuel mixture flow in the vicinity of the longitudinal axis and is thus efficiently atomized prior to being conducted into the port runners and engine cylinders.

The construction illustrated in Figures 1 to 5 inclusive is preferably adapted for use with an engine burning heavier and less volatile fuel, such as kerosene. One of the difficulties in burning a kerosene or other like fuel in engines is that the fuel tends to recondense between the fuel mixture distributing chamber 13 and the engine cylinders. By applying heat to the lateral runner portion of the intake manifold the tendency of this fuel mixture to recondense is substantially eliminated and the construction of the lateral runner is such as to facilitate the revaporization of any fuel which may condense in said lateral runner.

Although this construction illustrated in Figs. 1 to 5 inclusive and which has been described in detail in the preceding paragraphs is especially adapted for use with an engine burning kerosene or like fuels it is evident that the principles of my invention as embodied in these illustrations may be employed with engines burning more volatile and lighter fuel such as gasoline. In Figures 6 to 9 inclusive the principles of my invention are illustrated in connection with a manifold structure which is constructed for use with an engine employing a lighter fuel such as gasoline or the like.

With particular reference to Figs. 6 to 9 inclusive, 30 designates an internal combustion engine having a fuel mixture forming device or carburetor 31. The intake manifold structure B associated with this engine is provided with a fuel mixture distributing chamber 32 and with a primary fuel mixture conducting portion 33 for connecting the distributing chamber with the fuel mixture forming device or carburetor 31. In the construction illustrated in Figs. 7 and 8, it will be noted that the top walls 34 and bottom wall or floor 35 of the lateral runner portions 36 are constructed substantially parallel with a horizontal plane through the engine and are provided with stepped portions 37 and 38 respectively. These stepped portions 37 and 38 are respectively formed by providing a series or plurality of shoulders 39 and 40 and it will be noted that the lateral runners are thus provided with a plurality of successively arranged stepped portions which are in general similar to the stepped portions illustrated in Fig. 2.

Preferably the manifold structure as illustrated in Figs. 7 and 8 is provided with a longitudinally extending groove 41 in the bottom wall or floor of the lateral runner portions 36. Preferably this groove is arranged centrally of the floor and extends preferably in a vertical plane containing the axis of the lateral runner.

The purpose of the groove within the lateral runner is to induce a stratified fuel flow in the runner during the operation of the engine. It will be noted that this groove is arranged intermediate the stepped portions in the floor of the runner and it may be said that said stepped portions are constructed to lie on either side of the groove and this construction differs from the construction illustrated in Figs. 2 and 3 only to the extent that the stepped portions lie in the same plane in Figs. 7 and 8 while in the construction illustrated in Figs. 2 and 3 the stepped portions lie in converging planes. In the construction illustrated in Figs. 2 and 3 the port runners are provided with relatively short groove portions 41' and the downwardly converging side walls of the runner portions provide a channel which acts in a manner similar to the groove 41 illustrated in the construction shown in Figs. 7 and 8.

In Fig. 8 the flow of the fuel in the manifold structure B is indicated by means of arrows 42. It will be noted that the shoulders 39 in the top wall tend to deflect the fuel mixture downwardly towards the center of the runner while the shoulders 40 in the bottom wall tend to deflect the fuel mixture upwardly towards the center of the runner. Thus the fuel mixture is acted upon in such a way as to eliminate the tendency of the same to creep along the wall of the runner.

When an engine is idled experience has shown that there is a fuel film along the bottom wall of the runners and on accelerating the engine the increased suction tends to sweep this fuel film directly into the engine cylinders. In the illustrated embodiment of my invention I have protrated a plurality of shoulders forming a plurality of successively arranged stepped portions. These shoulders form abrupt impediments to the sweeping of the fuel film directly into the engine cylinders and the suddenly increased suction induced by accelerating the engine causes the fuel film to be broken and the wet particles of fuel deflected towards the central portion of the runner where the same is acted upon by the high velocity fuel mixture flow and these wet fuel particles are thus broken up and finely atomized.

Tests carried out on a manifold constructed as shown in the illustrated embodiment of my invention show that substantially all the fuel mixture is atomized on accelerating the engine and in the apparatus for testing these manifold structures in the laboratories of the assignee company, a uniform fog or mist was exhausted through the outlet ports of the manifold branches on accelerating the engine when the manifold structure was provided with successively arranged stepped portions as shown in the accompanying drawings.

Much of the difficulty in properly distributing fuel mixture to the engine cylinders of an internal combustion engine arises at low engine speeds and during engine accelerating due principally to the fact that a considerable portion of the wet fuel is conducted in a stream along the bottom wall or floor of the manifold branches. By providing these stepped portions the flow of the wet fuel film along the floor of the runner is broken up and the difficulties encountered with distributing and dividing this film flow is eliminated. Results have shown that an improved fuel distribution can be obtained with a manifold structure constructed in accordance with the principles of my invention illustrated in the accompanying drawings. Experience has shown that better fuel economy can be obtained with the construction herein illustrated and this fuel economy is readily apparent in engines operated at relatively slow speeds, due to the fact that the fuel is more efficiently atomized. Even at high speeds a better fuel economy is apparent due to the fact that the fuel mixture flow is more efficiently controlled.

In Fig. 9 of the drawings I have illustrated the principle of my invention incorporated in a downdraft manifold in which the floor of the manifold branches is provided with plurality of stepped portions constructed in a manner similar to that shown in the construction illustrated in the other figures. This manifold structure C includes the lateral runners 50, 51 designating the stepped portions and 52 the grooves preferably constructed in the floor of the runner and arranged to extend longitudinally adjacent the center of the floor. In this construction the fuel mixture and the wet particles of fuel on the floor of the manifold structure are acted upon in a manner similar to the action described in connection with the preceding figures, the arrows 53 illustrating diagrammatically the action and the manner in which the fuel mixture and wet particles of fuel are deflected into the central portion of the runner, the wet particles being thus efficiently and thoroughly atomized when being thrown into the high velocity fuel mixture stream.

It will be apparent to those skilled in the art to which my invention pertains that various modifications and changes may be made therein without departing from the spirit of my invention or from the scope of the appended claims.

What I claim as my invention is:

1. An intake manifold structure for an internal combustion engine including a fuel mixture conducting portion for conducting fuel mixture to the engine, said fuel mixture conducting portion including a wall provided with successive stepped portions for deflecting the fuel mixture flow away from said wall towards the central portion of said fuel mixture conducting portion.

2. An intake manifold structure for an internal combustion engine including a fuel mixture conducting portion for conducting fuel mixture to the engine, and constructed substantially triangular in cross section.

3. An intake manifold structure for an internal combustion engine including a fuel mixture conducting portion for conducting fuel mixture to the engine, and constructed substantially triangular in cross section thereby forming a conducting portion having upwardly diverging side walls, and means applying heat to the underside of said fuel mixture conducting portion.

4. An intake manifold structure for an internal combustion engine including a fuel mixture conducting portion for conducting fuel mixture to the engine, and constructed substantially triangular in cross section and arranged to provide a conducting portion having a top relatively flat wall and downwardly converging side walls, and means applying heat to that portion of said fuel mixture conducting portion adjacent the intersection of said side walls.

5. An intake manifold structure for an internal combustion engine including a primary fuel mixture conducting portion and oppositely extending manifold branches for conducting the fuel mixture to the engine, said branches extending laterally and upwardly from said primary fuel mixture conducting portion and each having a wall provided with successively arranged stepped portions for deflecting the fuel mixture flow away from said walls towards the central portion of said branches.

6. An intake manifold structure for an internal combustion engine including a primary fuel mixture conducting portion, a fuel mixture distributing chamber, and manifold branches communicating with said distributing chamber, said branches having a wall provided with successively arranged stepped portions for deflecting the fuel mixture flow away from said wall towards the central portion of said branches.

7. An intake manifold structure for an internal combustion engine including a primary fuel mixture conducting portion, a fuel mixture distributing chamber, and manifold branches communicating with said distributing chamber, and each consisting of lateral and port runner portions, said lateral runner portions having a wall provided with successively arranged stepped portions for deflecting the fuel mixture flow away from said wall towards the central portion of said branch.

8. An intake manifold structure for an internal combustion engine including a primary fuel mixture conducting portion, a fuel mixture distributing chamber, and manifold branches communicating with said distributing chamber, and each consisting of lateral and port runner portions, said lateral runner portions constructed substantially triangular in cross section and having wall portions provided with successively arranged stepped portions for deflecting the fuel mixture flow away from said wall portions towards the central portion of said lateral runner portions.

9. An intake manifold structure for an internal combustion engine including a riser and a distributing chamber, a manifold branch extending laterally from said chamber for conducting a fuel mixture to the engine, said branch having deflecting means constructed to urge the relatively heavier fuel particles towards the floor of the manifold branch, and means for conducting exhaust gases in heat transference relation with the floor of said branch portion, said deflecting means being spaced from said distributing chamber.

10. An intake manifold structure for an internal combustion engine including a manifold branch for conducting a fuel mixture to the engine, said branch having side walls provided with outwardly and downwardly sloping stepped portions for deflecting a portion of the fuel mixture towards the floor of said branch, and means for applying heat to the floor of said branch portion.

11. A manifold structure for an internal combustion engine including a primary intake fuel mixture conducting portion and branch intake manifold portions substantially triangular in cross-section and communicating with said primary conducting portion, and an exhaust manifold section underlying said intake manifold branch portions in heat conductive relation therewith.

12. An intake manifold structure for an internal combustion engine including a branch manifold portion for conducting a fuel mixture to the engine and provided with a channel for inducing a stratified fuel mixture flow, said branch portion provided with stepped portions positioned to either side of said channel.

13. An intake manifold structure for an internal combustion engine including a branch manifold portion for conducting a fuel mixture to the engine and provided with means inducing a stratified fuel mixture flow in a vertical plane extending longitudinally and centrally of the branch, said branch portion provided with successively arranged means for deflecting said fuel mixture off a wall or walls thereof.

14. An intake manifold structure for an internal combustion engine including a branch manifold portion having a floor provided with a plurality of stepped portions on which a fuel film tends to accumulate, whereby on accelerating the engine said fuel film is deflected into the central portion of said branch manifold portion and atomized.

15. An intake manifold structure for an internal combustion engine including a branch manifold portion provided with spaced multi-stepped portions and an intermediate groove inducing a stratification of said fuel mixture flow.

16. An intake manifold structure for an internal combustion engine including a branch manifold portion for conducting a fuel mixture to the engine and provided with a plurality of abrupt successively arranged stepped portions.

17. An intake manifold structure for an internal combustion engine including a fuel mixture conducting portion for conducting fuel mixture to the engine, said conducting portion having upwardly diverging side walls.

18. An intake manifold structure for an internal combustion engine including a fuel mixture conducting portion for conducting fuel mixture to the engine, said conducting portion having a relatively flat top wall and downwardly converging side walls.

19. An intake manifold structure for an internal combustion engine including a fuel mixture conducting portion for conducting fuel mixture to the engine, said conducting portion having downwardly converging side walls terminating substantially in close juxtaposition to each other to form a substantially V-shaped groove for inducing a stratified fuel flow in said conducting portion.

20. An intake manifold structure for an internal combustion engine including a fuel mixture conducting portion for conducting fuel mixture to the engine, said conducting portion having downwardly converging side walls terminating substantially in close juxtaposition to each other to form a substantially V-shaped groove for inducing a stratified fuel flow in said conducting portion, and means applying heat to the lower portion of said downwardly converging side walls.

21. An intake manifold structure for an internal combustion engine including a fuel mixture distributing portion, fuel mixture conducting portions for conducting fuel mixture to the engine and communicating with said distributing portion, said conducting portions constructed substantially rectangular in cross-section adjacent said distributing portion and merging into a conducting portion substantially triangular in cross-section remote from said distributing portion.

22. An intake manifold structure for an internal combustion engine including a fuel mixture distributing portion, fuel mixture conducting portions for conducting fuel mixture to the engine and communicating with said distributing portion, said conducting portions constructed substantially rectangular in cross-section adjacent said distributing portion and merging into a conducting portion substantially triangular in cross-section remote from said distributing portion, and deflecting means adjacent the rectangular portion of the fuel mixture conducting means and acting on said fuel mixture to direct same away from the wall of said conducting portion whereby to counteract the tendency of the fuel to creep along said wall of the fuel mixture conducting portion.

23. In a manifold, a riser, said manifold having a distributing chamber portion directly communicating with the riser outlet, branches extending laterally from said chamber portion, a heater jacket for said riser, said jacket being spaced from said chamber portion substantially opposite said riser to provide an air pocket intermediate said jacket and said chamber portion.

24. In a manifold, a riser, said manifold having a distributing chamber portion directly communicating with the riser outlet, branches extending laterally from said chamber portion, a heater jacket for said riser, said jacket being spaced from said chamber portion substantially opposite said riser to provide an air pocket intermediate said jacket and said chamber portion whereby the upper wall of said chamber portion is maintained relatively cool, and means for applying heat to the lower walls of said branches.

25. In a manifold, a riser, said manifold having a distributing chamber portion directly communicating with the riser outlet, branches extending laterally from said chamber portion, a heater jacket for said riser, said jacket being spaced from said chamber portion substantially opposite said riser to provide an air pocket intermediate said jacket and said chamber portion whereby the upper wall of said chamber portion is maintained relatively cool, means for applying heat to the lower walls of said branches, and means associated with the upper walls of said branches for deflecting fuel toward said lower wall.

HAROLD H. TIMIAN.